US006320919B1

United States Patent
Khayrallah et al.

(10) Patent No.: US 6,320,919 B1
(45) Date of Patent: Nov. 20, 2001

(54) ADAPTIVE CHANNEL CHARACTERIZATION USING DECODED SYMBOLS

(75) Inventors: Ali S. Khayrallah, Apex; Tracy Fulghum, Garner, both of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/201,623

(22) Filed: Nov. 30, 1998

(51) Int. Cl.$^7$ ................................. H04B 7/10; H04L 1/02
(52) U.S. Cl. ........................ 375/347; 375/342; 375/341
(58) Field of Search ..................................... 375/347, 262, 375/265, 341, 261, 231, 285, 340, 342; 714/755, 789, 796, 790, 792, 786

(56) References Cited

U.S. PATENT DOCUMENTS

| | | | |
|---|---|---|---|
| 4,621,365 | * 11/1986 | Chiu ....................................... | 375/208 |
| 5,363,408 | * 11/1994 | Paik et al. ............................. | 375/261 |
| 5,432,821 | * 7/1995 | Polydoros et al. .................... | 375/340 |
| 5,488,635 | 1/1996 | Chennakeshu et al. ............. | 375/340 |
| 5,680,419 | 10/1997 | Bottomley . | |
| 5,822,380 | 10/1998 | Bottomley . | |
| 6,005,897 | * 12/1999 | McCallister et al. ................. | 375/340 |
| 6,185,259 | * 2/2001 | Dent ..................................... | 375/261 |

FOREIGN PATENT DOCUMENTS

| | | |
|---|---|---|
| 0 550 143A2 | 7/1993 | (EP) . |
| 0 631 399A1 | 12/1994 | (EP) . |
| 802656A2 | 10/1997 | (EP) . |

OTHER PUBLICATIONS

Fechtel, et al., Optimal Parametric Feedforward Estimation of Frequency–Selective Fading Radio Channels; *IEEE Transactions on Communications*, vol. 42, No. 2/3/4. Feb./Mar./Apr. 1994, pp. 1639–1650.

Kuo, et al., Designs for Pilot–Symbol–Assisted Burst–Mode Communications with Fading and Frequency Uncertainty, *International Journal of Wireless Information Networks*, vol. 1, No. 4, 1994, pp. 239–252.

Cavers, et al., An Analysis of Pilot Symbol Assisted Modulation for Rayleigh Fading Channels, *IEEE Transactions on Vehicular Technology*, vol. 40, No. 4, Nov., 1991, pp. 686–693.

Cavers, et al., Cochannel Interference and Pilot Symbol Assisted Modulation, *IEEE Transactions on Vehicular Technology*, vol. 42, No. 4, Nov., 1993, pp. 407–413.

Bottomley, Adaptive Arrays and MLSE Equalization, Proceedings of Vehicular Technology Conference, 1995.

(List continued on next page.)

*Primary Examiner*—Chi Pham
*Assistant Examiner*—Phoung Phu
(74) *Attorney, Agent, or Firm*—Myers Bigel Sibley & Sajovec

(57) ABSTRACT

Methods and systems are provided for channel tracking utilizing multi-pass demodulation in which, during the second pass, decoded symbols are treated as known symbols which are used to calculate the error term used in updating the propagation characterization during the second pass. This allows a higher bandwidth to be used for updating the propagation characterization while known symbols are being processed. In particular, the propagation characterization may be provided by a channel tracker or a multi-antenna receiver, such as an interference rejection/combining (IRC) system, with an impairment correlation matrix estimator or a combination of both. Accordingly, the spatial diversity characteristics of the received signal (from IRC) and the temporal (or timing) characteristics (from the channel tracker) may both be tracked at different bandwidths for decoded and undecoded symbols to allow improved performance under fast changing channel conditions while maintaining desired performance characteristics while processing undecoded symbols.

32 Claims, 7 Drawing Sheets

OTHER PUBLICATIONS

Molnar, et al., D–Amps Performance in PCS Bands with Array Processing, Proceedings of Vehicular Technology Conference, 1996.

Bottomley et al., Interference Cancellation for Improved Channel Estimation in Array Processing MLSE Receivers, Proceedings of Vehicular Technology Conference, 1997.

Jamal et al., Adaptive MLSE Performance on the D–AMPS 1900 Channel, *IEEE Transactions on Vehicular Technology*, vol. 46, No. 3, Aug., 1997, pp. 634–641.

Soosan Beheshti et al., Joint Intersymbol and Multi–Access Interference Suppression Algorithms for CDMA Systems, European Transactions on Telecommunications, IT, Eurel Publication Milano, vol. 9 No. 5, Sep. 1, 1998.

* cited by examiner

ADAPTIVE CHANNEL CHARACTERIZATION USING DECODED SYMBOLS

FIELD OF THE INVENTION

The present invention relates to wireless communications and, in particular, to the characterization of channel response in digital wireless mobile radio systems.

BACKGROUND OF THE INVENTION

The radio channel over which a modulated signal propagates in mobile wireless communications may be one of the most harsh mediums in which to operate. The transmitted signals are often reflected, scattered, diffracted, delayed and attenuated by the surrounding environment. Moreover, the environment through which the signal passes from the transmitter to the receiver is not stationary due to the mobility of the user and surrounding objects. Characteristics of the channel environment also differ from one area to another. Radio propagation in such environments is characterized by multi-path fading, shadowing, and path loss. Multi-path fading may be characterized by envelope fading, Doppler spread and time-delay spread.

Multi-path waves typically combine at the receiver antenna to give a resultant signal which can vary widely in amplitude and phase. Therefore, signal strength may fluctuate rapidly over a small distance traveled or time interval, causing envelope fading. The statistical time varying nature of the received envelope of a flat fading signal, or the envelope of an individual multi-path component, is commonly characterized as a Rayleigh distribution. In satellite mobile radio and in micro-cellular radio, in addition to the many multi-path waves, a dominant signal, which may be a line-of-sight (LOS) signal, arrives at the receiver and gives rise to a Ricean distributed signal envelope. This dominant path significantly decreases the depth of fading depending on the Ricean parameter, K, which is defined as the ratio of the power in the dominant path to the power in the scattered paths.

Doppler shift is the frequency shift experienced by the radio signal when a wireless receiver, such as a wireless mobile terminal, is in motion. Doppler spread is a measure of the spectral broadening caused by the time rate of change of the mobile radio channel. Doppler spread may lead to frequency dispersion with the Doppler spread in the frequency domain being closely related to the rate of change in the observed signal. Hence, the adaptation time of the processes which are used in the receivers to track the channel variations generally should be faster than the rate of change of the channel to be able to accurately track the fluctuations in the received signal.

The dynamic characteristics of the radio channel present difficulties in tracking the channel to allow for decoding of information contained in the received signal. Often, in wireless mobile radio systems, known data sequences are inserted periodically into the transmitted information sequences. Such data sequences are commonly called synchronizing sequences or training sequences and are typically provided at the beginning of a frame of data. Channel estimation may be carried out using the synchronizing sequences and other known parameters to estimate the impact the channel has on the transmitted signal. After determining the channel response, the channel estimator enters a "decision directed" mode where the symbol estimates are used to estimate the channel.

For systems where fading changes generally occur very slowly, least square estimation may be an efficient way of estimating the channel impulse response in the presence of additive white Gaussian noise. If the fading rate is slow compared to the frame rate, the channel estimates can be updated frame by frame without significant inaccuracy. However, for many wireless mobile radio systems, the channel response changes very rapidly over a small travel distance or time interval. For example, for higher frequency bands such as those used in the Personal Communication Systems (PCS), the Doppler spread, hence, the rate of change in the observed signal, may be increased to the point that even during the reception of the synchronizing sequences, the mobile radio channel response may not be constant. Therefore, the need to track the channel parameters for fast time-varying systems provides a requirement for more robust receiver structures to enhance the receiver performance.

The most commonly used channel tracking methods are the Least Mean Square (LMS) and Recursive Least Square (RLS) based algorithms. See for example, "Optimal Tracking of Time-varying Channels: A Frequency Domain Approach for known and new algorithms," *IEEE transactions on selected areas in communications*, Vol. 13, No. 1, January 1995, Jingdong Lin, John G. Proakis, Fuyun Ling. Stochastic based methods have recently been introduced that incorporate prior knowledge about the channel coefficient in the estimation. In contrast to the LMS and RLS, these methods provide for the extrapolation of the channel coefficients in time. More details on these approaches can be obtained in, "A wiener filtering approach to the design of tracking algorithms", *Uppsala University Department of technology and signal processing group*, Lars Lindbom, 1995.

One difficulty with the adaptive channel tracker methods is that during the decision directed mode the estimated symbols are used for the channel response adaptation. Therefore, the effect of using potentially incorrect decisions needs to be considered for parameter selection. Tuning of design parameters may result in a trade-off between tracking capability and sensitivity to noise. For example, if the adaptation gain of the channel tracker is very large, then, the channel tracker may become very sensitive to noise and to incorrect symbol decisions. On the other hand, if the adaptation gain is chosen to have a small magnitude, the ability to track the variation of the channel parameters may be lost. Specifically, in those systems where coherent modulation and coherent demodulation schemes are used, these issues become more serious compared to systems where differential modulation is implemented.

In coherent modulation schemes like coherent Quadrature Phase Shift Keying (QPSK), even if the channel tracker tracks the magnitude of the channel response well, the channel phase may slip (i.e., the tracker can lock on a wrong phase offset) during a deep fade of the in-phase and/or quadrature phase component of the channel, resulting in a phase offset of $k2\pi/m$. In other words, the tracker actually tracks well but with an offset, which consequently causes symbol rotation and error propagation. Because the channel phase rotation and symbol rotation are in the opposite direction, a conventional tracker typically is not able to correct the problem. Thus, all the remaining information symbols may be lost because of this phase rotation until a new frame and synchronization sequence is received.

Other approaches have also been applied to improving performance of reception over communication channels subject to interference. For example, various standards have been introduced applicable to wireless digital services including the IS-136 and IS-95 standards. These and other systems are described in *The Mobile Communications Handbook*, edited by Gibson and published by CRC Press (1996). Various of these specifications provide for the use of both encoded and unencoded bit classes within a data frame. An example of the use of both encoded and unencoded bits as provided by the IS-641 specification will now be described.

An Adaptive Code Excited Linear Prediction (ACELP) source provides a data frame of 148 bits. 48 of the bits are classified as Class 1A and are processed through a CRC error detection coder to generate error detection code that is appended to the bits. An additional 48 of the bits from the 148 bit data frame are treated as Class 1B bits and are processed through a convolutional coder without error detection coding. The remaining 52 bits are treated as Class 2 bits and provided directly to an interleaver without coding. The Class 1A and 1B bits are processed through the convolutional encoder and, in turn, the resulting error correction coded output bits are punctured to provide a total of 260 bits to a two-slot interleaver after being combined with the 52 Class 2 bits. Interleaving is implemented by dividing the 148 bits into two separate slots which are provided to a modulator for transmission. Typically, Differential QPSK (DQPSK) modulation is provided with quaternary symbols each representing two bits of data.

Interference rejection/combining (IRC) is another technique used for the mitigation of co-channel interference in receivers with antenna diversity. An example of such an approach is provided in U.S. Pat. No. 5,680,419 entitled "Method of and Apparatus for Interference Rejection Combining in Multi-Antenna Digital Cellular Communications Systems," which is incorporated herein by reference in its entirety. The use of IRC with multiple antennas provides significant improvements in reception performance under slow fading conditions. However, under fast fading conditions, limitations on the required tracking process typically limit the performance improvements provided by IRC. These reduced benefits result from degradation of the tracking processes during fast fading.

Multi-pass demodulation (MPD) is another technique that takes advantage of the presence of coding in the communication system. Conventional receivers typically treat demodulation and decoding separately. The demodulator produces hard or soft decisions and then the decoder stage operates on those decisions to produce the final information. This separation of demodulation and decoding provides for reasonable complexity in receiver design, in particular, when interleaving is used in the communication system. In interleaved based systems, the output of the demodulator is first de-interleaved and then fed to the decoder. Multi-pass demodulation utilizes feedback from the decoder to the demodulator to improve system performance. An example of a multi-pass demodulation based demodulator/decoder is provided in U.S. Pat. No. 5,673,291 entitled "Simultaneous Demodulation and Decoding of a Digitally Modulated Radio Signal Using Known Symbols," which is incorporated herein by reference in its entirety. The '291 patent discusses demodulating a received signal first, then decoding coded symbols, then feeding information obtained by re-encoding the decoder output back to the demodulator to re-demodulate the un-coded symbols with improved performance. The re-encoded symbols are exploited as known symbols by the demodulator, in the same way that it exploits sync symbols, which are true known symbols that have been inserted in the data prior to transmission. A further example of the use of multi-pass demodulation is provided in U.S. patent application Ser. No. 09/201,651 entitled "Systems and Methods for Receiving a Modulated Signal Containing Encoded and Unencoded bits Using Multi-Pass Demodulation" which is also incorporated herein by reference in its entirety.

SUMMARY OF THE INVENTION

In light of the above discussion, it is an object of the present invention to provide a method for characterizing propagation of a modulated signal, such as a channel of a wireless communication system, which responds to variations in the propagation including channel fade.

It is a further object of the present invention to provide such methods which are able to respond to rapidly changing propagation conditions.

These and other objects of the present invention are provided by utilizing multi-pass demodulation in which, during the second pass, decoded symbols are re-encoded and treated as known symbols and used to calculate the error term used in updating the propagation characterization during the second pass. This allows a higher bandwidth to be used for updating the propagation characterization while known symbols are being processed. In particular, the propagation characterization may be provided by a channel tracker or a multi-antenna receiver, such as an interference rejection/combining (IRC) system, with an impairment correlation matrix estimator or a combination of both. Accordingly, the spatial diversity characteristics of the propagation (from IRC) and the temporal (or timing) characteristics (from the channel tracker) may both be tracked at different rates (i.e. at a different bandwidth) for decoded (and re-encoded) and undecoded symbols to allow improved performance under fast changing channel conditions while maintaining desired performance characteristics while processing undecoded symbols. Thus, the propagation characterization may be initialized, such as at the start of a slot (frame) using a synchronization sequence, and then periodically updated at a high bandwidth using re-encoded estimates from decoded symbol information as known symbols.

In a particular embodiment of the present invention, methods and systems are provided for characterizing propagation of a modulated signal received by a wireless device by updating a propagation characterization at a first bandwidth responsive to an estimate generated from a first received signal corresponding to a decoded symbol and at a second bandwidth lower than the first bandwidth responsive to a second received signal corresponding to an undecoded symbol. The estimate generated from the received signals may be complex number symbols representing transmitted information from the modulated signal. The propagation characterization may be initialized before updating responsive to a synchronization period of the modulated signal. The propagation characterization may be provided by maintaining a channel estimate characterizing propagation of the modulated signal using a channel tracker wherein the channel tracker has a gain and the first bandwidth and the second bandwidth are established by setting the gain of the channel tracker.

In addition to channel tracking, the modulated signal in one embodiment is received by a plurality of spatially diverse antennas each of which provides a received signal output and each of which has an associated propagation characterization. The propagation characterization may then include maintaining an impairment correlation matrix for the plurality of antennas using an impairment correlation estimator wherein the impairment correlation estimator has a gain and the first bandwidth and the second bandwidth are established by setting the gain of the impairment correlation estimator.

According to another embodiment of the present invention, the modulated signal is received to provide the first received signal. The first received signal is first pass demodulated while updating the propagation characterization at the second bandwidth and then the demodulated first received signal is decoded to provide the estimate generated from the first received signal The first received signal is then second pass demodulated while updating the propagation characterization at the first bandwidth.

In a further embodiment of the present invention methods and systems are provided for receiving a modulated signal including a plurality of sequentially transmitted slots on a channel. One of the transmitted slots is received on a plurality of separate receive antennas to provide a plurality of received signals, each having a portion corresponding to encoded symbols and a portion corresponding to unencoded symbols. The received signals are demodulated while updating an estimate of the channel responsive to the received signals at a first bandwidth and an impairment correlation estimate for the plurality of separate receive antennas responsive to the received signals at a second bandwidth to provide a first slot estimate. A portion of the first slot estimate corresponding to the portion of the received signals corresponding to encoded symbols is then decoded to provide decoded symbol estimates. After the decoded symbol estimates are obtained, the received slot is again demodulated to provide a second slot estimate while updating the estimate of the channel responsive to the decoded symbol estimates at a third bandwidth greater than the first bandwidth and updating the impairment correlation estimate for the plurality of separate receive antennas responsive to the decoded symbol estimates at a fourth bandwidth greater than the second bandwidth.

In a further aspect of the present invention, method and systems for channel interpolation in a receiver receiving a DQPSK modulated signal having offset periods of known receive symbols and periods of unknown receive symbols are provided which may also be used with the above embodiments of the present invention. A plurality of channel estimates is maintained corresponding to π/2 radian phase shifts during demodulation between a first group of known receive symbols and a second group of known receive symbols. One of the plurality of channel estimates is selected to use for demodulating the signal between the first group and the second group of known receive symbols.

In one embodiment of the channel interpolation aspects of the present invention, the plurality of channel estimates corresponding to π/2 radian phase shifts is maintained during demodulation between the second group of known receive symbols and a third group of known receive symbols. One of the plurality of channel estimates is then selected to use for demodulating the signal between the second group and the third group of known receive symbols. One of the plurality of channel estimates may be selected based on a best metric selection criteria.

In another embodiment of the channel interpolation aspects of the present invention, a channel response is tracked based on the received DQPSK signal. The tracked channel response is compared to the plurality of channel estimates for a portion of the signal between the first group and the second group of symbols. One of the plurality of channel estimates which most closely agrees with the tracked channel response is then selected for the portion of the signal. The maintaining, comparing and selecting steps may be repeated for a plurality of portions of the signal between the first group and the second group of symbols. The selection may be provided by selecting the one of the plurality of channel estimates which most closely agrees with the tracked channel response based on a minimum mean square error criteria.

As will be appreciated by those of skill in the art, while the present invention has primarily been discussed in relation to its method aspects, it may also be embodied in a system such as a radiotelephone.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects. Like numerals refer to the same items throughout the present disclosure.

Figure 1:
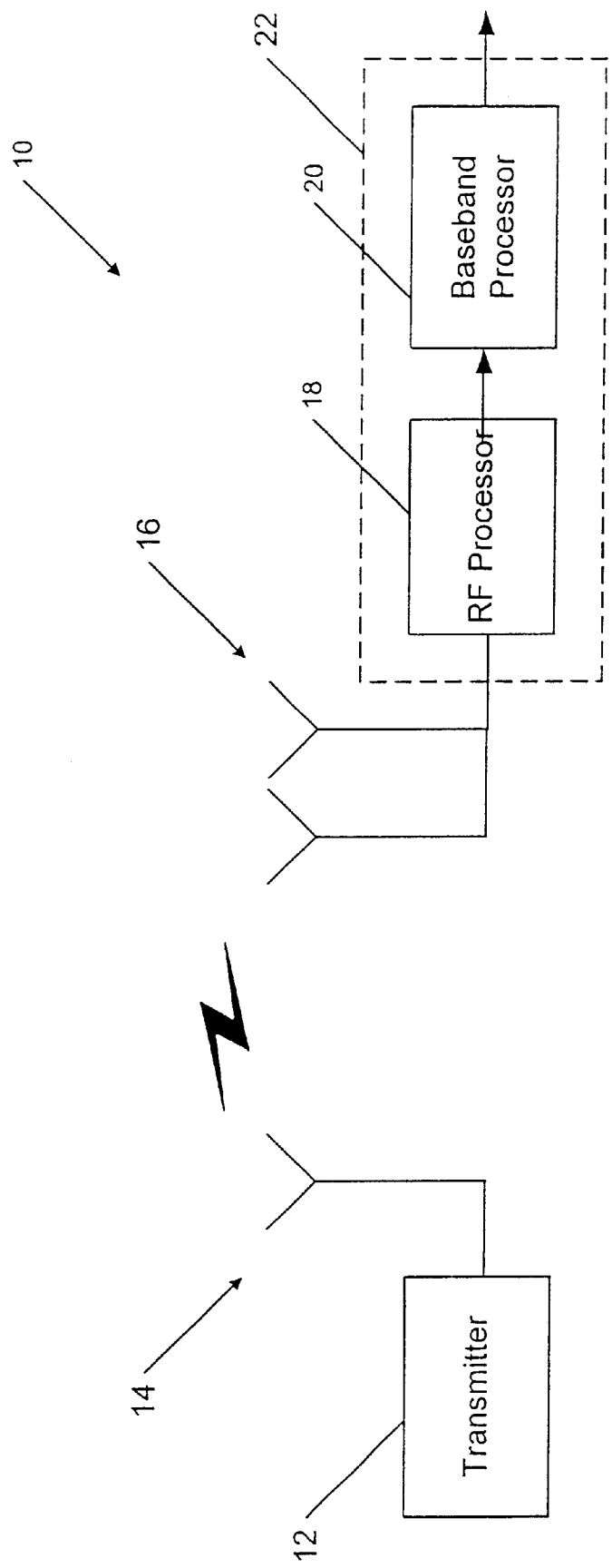
FIG. 1 illustrates a radio communication system in which the teaching of the present invention can be utilized.

FIG. 1 depicts a radio communications system 10 such as a cellular or satellite telephone system, in which the teachings of the present invention are utilized. As shown in FIG. 1, the radio communications system 10 includes a radio transmitter 12 having a transmit antenna 14, and a radio receiver 22. The radio receiver 22 includes a plurality of receive antennas 16, a radio frequency processor 18, and a baseband processor 20. An output of the radio transmitter 12 is coupled to the transmit antenna 14. The receive antennas 16 are coupled to a radio frequency processor 18. The output of the radio processor is provided to the inputs of the baseband processor 20.

In operation, the transmitter 12 transmits an information signal (modulated at a carrier frequency specified by the system and regulatory agencies and suitable for radio communication). The transmitted signal reaches the radio receiver 22 after passing through a propagation medium. The transmitted signal plus any noise are received at the receiver antennas 16. The received signal is processed by the radio frequency processor 18 to produce a baseband signal. Specifically, the radio processor 18 amplifies, mixes, filter, samples, and quantizes the signal to extract the baseband signal. The resulting baseband signal is provided to the baseband processor 20 for demodulation of the transmitted information signal.

The present invention utilizes re-encoded, decoded symbols from a first pass demodulation and decoding of encoded information in a received slot for calculation of an error term used in updating a propagation characterization (such as a channel estimate) in a second pass of demodulation. Thus, the channel tracker may more accurately track changes in the channel response of the channel corresponding to the received signal. Thus, the present invention is incorporated in the baseband processor 20 and utilized in demodulating the received signal to extract the transmitted information.

Figure 2:
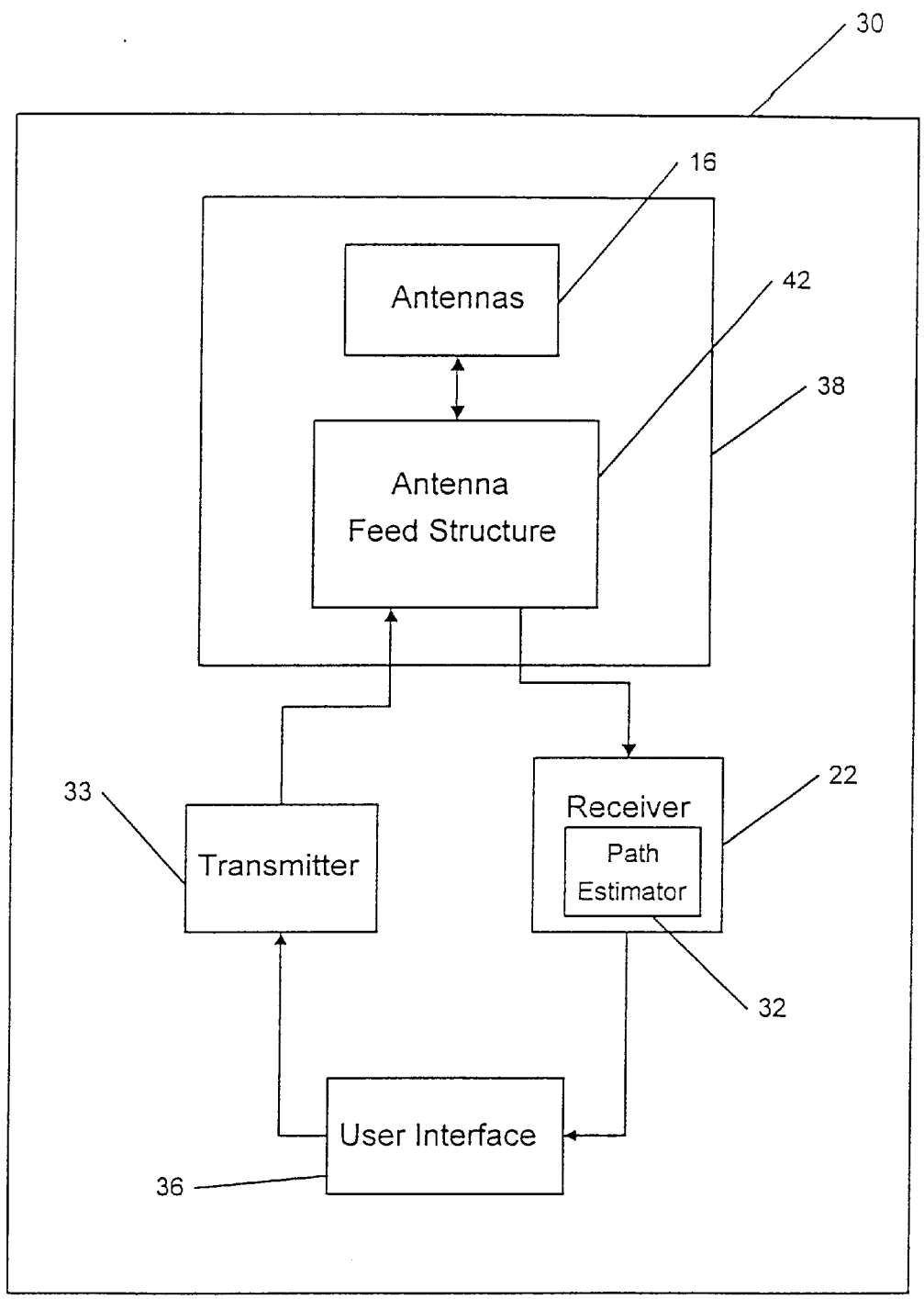
FIG. 2 is a block diagram of a radiotelephone according to the present invention.

An embodiment of a radiotelephone 30 which includes a propagation characterization estimator 32 according to the present invention is depicted in the block diagram of FIG. 2. As shown in FIG. 2, radiotelephone 30 typically includes a transmitter 33, a receiver 22, a user interface 36 and an antenna system 38. The antenna system 38 may include an antenna feed structure 42 and one or more antennas 16. As is well known to those of skill in the art, transmitter 33 converts the information which is to be transmitted by radiotelephone 30 into an electromagnetic signal suitable for radio communications. Receiver 22 demodulates electromagnetic signals which are received by radiotelephone 30 so as to provide the information contained in the signals to user interface 36 in a format which is understandable to the user. Receiver 22 includes an RF processor 18 and a baseband processor 20 as in FIG. 1 with propagation characterization estimator 32 being included in the baseband processor 20. A wide variety of transmitters 33, receivers 22, and user interfaces 36 (e.g., microphones, keypads, displays) which are suitable for use with handheld radiotelephones are known to those of skill in the art, and such devices may be implemented in radiotelephone 30. Other than the propagation characterization estimator 32 according to the present invention, the design of radiotelephone 30 is well known to those of skill in the art and will not be further described herein.

Figure 3:
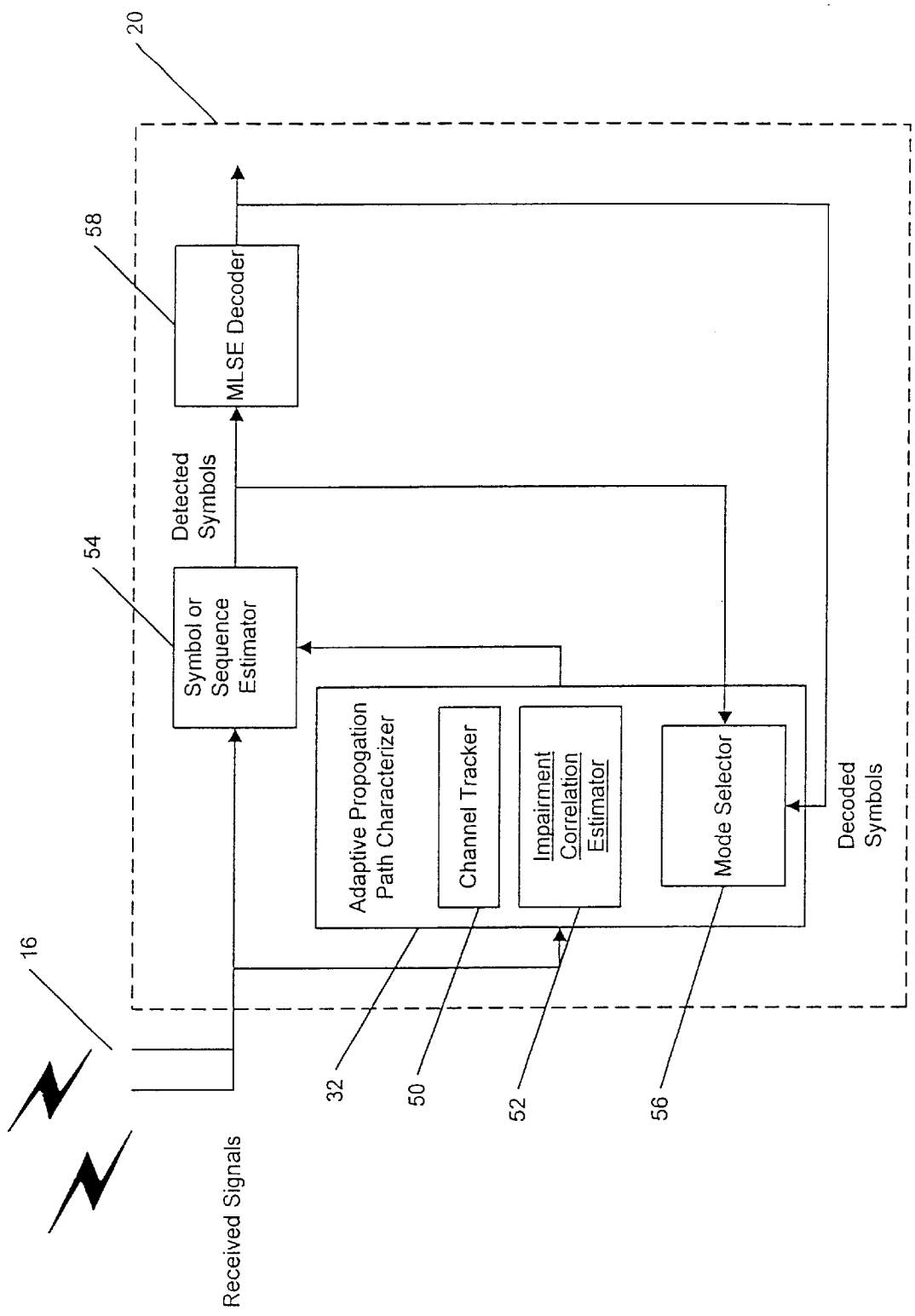
FIG. 3 is a block diagram of a baseband processor according to the present invention.

FIG. 3 depicts a baseband processor 20 according to the present invention. As shown, the received baseband signal from the antennas 16 are provided to the inputs of adaptive propagation characterization estimator 32 which includes a channel tracker 50 for tracking the channel time dispersion characteristics and an impairment correlation estimator 52 for estimating spatially correlated interference based on the signals from e.g., spatially diverse antennas 16. Also included in baseband processor 20 is symbol or sequence estimator 54. The output of the propagation characterization estimator 32 is also provided to the symbol or sequence estimator 54. The output of symbol or sequence estimator 54 is provided to a mode selector 56 and to error correction decoder 58. The output of decoder 58 provides decoded symbols representing the information from the received signals for user interface 36 which decoded symbols are re-encoded to provide estimates which are fed back to propagation characterization estimator 32.

The output of the mode selector 56 is provided to the adaptive propagation characterization estimator 32. As is further seen in FIG. 3, the mode selector 56 is also provided re-encoded, decoded symbols from decoder 58. These symbols correspond to the estimates of encoded information from the received signals after processing through error correction decoder 58 which are associated with particular portions of a received slot. The mode selector 56 provides for a selection of a base bandwidth for channel tracker 50 and impairment correlation estimator 52 while demodulating detected but undecoded symbols and a higher bandwidth for updating by channel tracker 50 and impairment correlation estimator 52 while demodulating symbols for which decoded symbols have been generated. Mode selector 56 further provides for use of the re-encoded, decoded symbols rather than the detected symbols as the input for error determination used in updating propagation characterization during periods of high bandwidth operation. It is to be understood that these operations are provided through two-pass demodulation with the same received signals representing a slot being processed a first time to generate the decoded symbols output from decoder 58 and then being processed a second time using the re-encoded, decoded symbols to allow faster updating of channel tracker 50 and impairment correlation estimator 52 during the second pass. Accordingly, based on this higher bandwidth channel tracking, an improved error rate may be obtained, particularly under fast fading conditions, in the detected symbols output by estimator 54 on the second pass of demodulation.

While not explicitly shown in the figures or discussed herein, the output of estimator (equalizer) 54 is typically first de-interleaved and then fed to decoder 58 when interleaved code is used such as the ACELP code. The output of decoder 58 may then be re-encoded, re-interleaved and fed back for use by the equalizer 54 as estimates generated from the first pass of demodulation of a portion of a received signal containing encoded information. In other words, while the output of decoder 58 as illustrated in FIG. 3 is being provided directly to user interface 36 and as a feedback to propagation characterizer 32, the decoded symbols are provided in a different form in each case. For example, for the user interface, binary bit information is typically provided by a reconstructed information frame. The decoded symbols fed back for use in the second pass of demodulation are presented in the form of symbols consistent with the detected symbol format generated by symbol or sequence estimator 54 (in other words, they are re-encoded). This may, for example, be in the form of complex numbers having both a real (amplitude) and imaginary (phase) component. Furthermore, the channel estimation updating adjustments may be based upon the phase component of the fed back and/or detected symbols representing timing error in the received signals.

Operations according to the present invention may be understood with reference to a coherent equalizer used for demodulation where the estimator 54 combined with channel tracker 50 and impairment correlation estimator 52 provides the coherent equalizer. A maximum likelihood sequence estimator (MLSE) may be provided as the sequence estimator 54 which operates on a trellis to search for the best symbols sequence. Using L to denote the number of antennas 16, and $r_k$ to denote the vector of L received values at time k and $r'_k$ to denote the corresponding vector of synthesized received values computed by the MLSE estimator using postulated symbols and channel estimates, operations will now be further described. The components of $r'_k$ are in the form as shown by the following equation:

$$C_0 S_k + C_1 S_{k-1} + \ldots + C_M S_{k-M}$$

where $S_k$ is the current postulated symbol, $S_{k-1}, \ldots, S_{k-M}$ are past symbols determined by the state of the MLSE trellis, and $c_0 \ldots, c_M$ are channel tap estimates of channel tracker 50. For each branch on the MLSE trellis, the branch metric is computed according to the following equation:

$$(r_k - r'_k)^H R_k^{-1} (r_k - r'_k)$$

where $R_k$ is the antenna short term impairment correlation matrix.

The MLSE 54 as described provides detected symbols to the channel tracker 50 and the impairment correlation estimator (or antenna tracker) 52. The channel tracker 50 uses the detected symbols and the received values to update the channel taps $c_0 \ldots, c_M$. Various channel tracking techniques are suitable for use with the present invention including LMS-type and Kalman-type trackers as well as autoregression trackers based on simplified Kalman filters. The output of the channel tracker 50 is fed back to the MLSE 54 to provide for coherent demodulation based on channel tracking.

The antenna tracker 52 similarly uses the detected symbols from MLSE 54 and the received signals to update the correlation matrix $R_k$ or its inverse. The tracking technique suitable for use in antenna tracking include those previously discussed for channel tracking. The output of the antenna tracker 52 is also provided for use by MLSE 54 in demodulation. Furthermore, at the beginning of a received slot, initial channel estimates developed by channel tracker 50, for example, based upon a synchronization burst, may be fed back to antenna tracker 52 to initialize its estimate of the channel spatial diversity characteristics.

The benefits of the present invention are obtained by improving known channel tracking and antenna tracking techniques through the use of feedback from the error correction decoder 58. Error correction decoder 58 may also be an MLSE type decoder such as is provided for under the ACELP standard. The feedback from decoder 58 for use in demodulation is provided by two pass demodulation. In the MLSE 54 on the second pass, the re-encoded symbols generated from the output of decoder 58 are assumed to be known information. In one aspect of the present invention, the fed back re-encoded symbols may be used to directly constrain the transitions of the trellis of MLSE 54 to insure that, on the second pass, the detected symbols output corresponds to the re-encoded decoded symbols for portions of the received slot which correspond to error correction encoded information. Direct constraints of MLSE 54 may be provided, for example, by applying biases to the branch metrix of the trellis to get the affect of constraining transitions. Alternatively, as will be described herein, the re-encoded decoded symbols may be used in updating the propagation characterization estimator 32 without constraining MLSE 54 by use of mode selector 56 utilizing the appropriate source in generating error values for updating propagation characterization estimator 32.

According to the teachings of the present invention, regardless of the method of providing the decoded symbol information to propagation characterization estimator 32, the reconstructed symbol information is used effectively as additional pilot symbols to supplement the synchronization sequence typically provided at the beginning of a slot for training the propagation characterization estimator 32. In conventional trackers, it is beneficial to use a different set of parameters for tracking when the tracker is processing received values corresponding to the initial synchronization or training symbols which are known to the receiver based upon the communication protocol. Specifically, tracking is allowed to have an increased bandwidth in the sense that the synchronization or training symbols are allowed to influence the updates more so than for updating based on unknown detected symbols. This is generally referred to as a training mode.

The information from the decoded symbol estimates according to the present invention is also used for controlling antenna and channel tracking. That is, the channel and/or antenna tracker may be switched to a pseudo-training mode over the decoded symbol periods. The bandwidth or gain set for the pseudo-training mode may be the same as that used for traditional training mode or may be chosen to have an intermediate bandwidth which could, for example, be varied based upon a soft output from decoder 58 wherein the bandwidth is increased or decreased depending upon the confidence indicated in whether the estimate output from decoder 58 is actually a "known" bit. By providing this pseudo-training mode for both the antenna tracker and the channel tracker, both techniques benefit directly from decoder feedback in addition to benefiting indirectly when combined with the use of techniques constraining the trellis of MLSE 54 to provide improved performance of receiver baseband processor 20.

While the invention has been described above for two-pass multi-pass demodulation and with reference to a particular coding format of ACELP, it is to be understood that the invention is not limited to such embodiments. The invention may be used with a variety of coding formats containing error correction encoded information which may be used and processed as pseudo-known bits for purposes of training a propagation characterization estimator. Furthermore, while the invention has been described, as operating on both a channel tracker and an antenna tracker, it is to be understood that benefits may be obtained by applying the present invention to either antenna tracking or channel tracking separately. It is also to be understood that while the description above was primarily directed to hard decisions from the decoder, it can equally be utilized with a soft decision decoder output providing for variable bandwidths of gains based on the confidence level and the symbols used as pseudo known symbols or high bandwidth training of the tracking circuitry.

As will be appreciated by those of skill in this art, the above-described aspects of the present invention in FIGS. 1–3 may be provided by hardware, software, or a combination of the above. Although various components of ready telephone 30 and included baseband processor 20 have been illustrated as discrete components, they may also, in practice, be implemented in an integrated fashion using a microcontroller including input and output ports and running software code, by custom or hybrid chips, by discrete components or by a combination of the above. For example, all or some of the components represented in baseband processor 20 may be implemented using a microprocessor or a digital signal processor, or by an application specific integrated circuit (ASIC). Similarly, various of the operations of baseband processor 20 illustrated at separate blocks in the Figures may be implemented as code executing on a processor.

Figure 4:
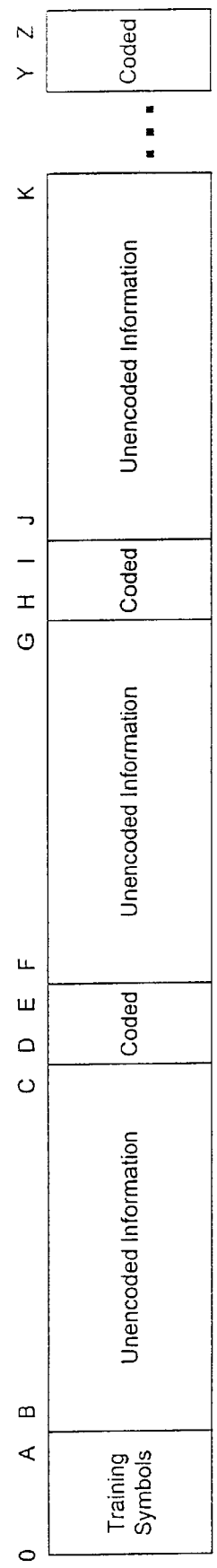
FIG. 4 illustrates a specific frame structure according to one embodiment of the present invention.

FIG. 4 illustrates a frame (slot) structure which may be utilized with the present invention. As seen in FIG. 4, the frame includes a synchronizing portion 0 to A containing training symbols, information portions B–C, F–G and J–K associated with unencoded symbol information and information portions D–E, H–I and Y–Z associated with encoded symbol information. The synchronizing portion of the frame is a series of predefined symbols, from 0 to A in FIG. 4, which are the same for each received frame. The information portion of the frame contains the information to be transmitted in the frame. As will be appreciated by those of skill in the art in light of the present disclosure, the frame structure of FIG. 4 is merely illustrative and the present invention should not be construed as limited to any particular frame structure but may be used with any of a number of frame structures which include unencoded and encoded symbol information.

In operation, during the synchronizing period of each frame, the mode selector 56 provides known symbols to the propagation characterization estimator 32. These symbols may, for example, be stored in memory and accessed during the synchronization portion of a received frame. During the synchronization portion of the received frame, the estimator 32 estimates the propagation response characteristics using any number of well known methods of channel estimation. For example, a least square (LS) estimator may be utilized which minimizes the squared difference between the actual received signal and the reconstructed signal based on the known symbol of the synchronization portion of the frame.

These initial estimates which are obtained by the LS estimator are used as initial estimates for the channel tracker 51 and antenna tracker 52. Because the channel may change very rapidly, and an LS estimator provides an average channel parameter estimation during the training period, it is typically not desirable to use these initial estimates (starting from the first information symbol after the synchronizing period (represented as B in FIG. 4) of the information field just after the synchronization sequence) for tracking the channel. Instead, the channel tracker 50 of the adaptive propagation characterization estimator 32 begins tracking the channel from the first symbol (represented as 0 in FIG. 4) of the synchronization sequence using the initial estimates provided by least square determination and tracks the channel until the last symbol (A) of the synchronization sequence in the training mode. The channel estimate at this point (A) is more reliable than the average channel estimate obtained by the least square determination. Thus, during the synchronization sequence, the propagation characterization estimator 32 will typically converge to a reasonable value and the estimates at the end of the training period (A) will follow the changes in the channel during the training mode.

After the training sequence, the mode selector 56 changes to decision directed mode and provides the output of the symbol or sequence estimator 54 to the channel tracker 50 and antenna tracker 52. Thus, starting from the first symbol (B) of the information sequence just after the training sequence, the estimated symbols at the output of the symbol or sequence estimator 54 are used for the estimation of the channel response. The channel estimation in decision directed mode continues until the last symbol (C) of the first information sequence associated with unencoded symbol information.

While the propagation characterization estimator 32 is operating in decision directed mode, it may lose the ability to track the real radio channel depending on the parameter selection. Typically, tracking becomes progressively worse over the decision direction section. Furthermore, the propagation characterization estimator 32 may be able to closely follow the amplitude of the channel but the phase of the estimated parameters might slip with respect to the actual channel. These errors may propagate as incorrect channel estimates which may result in incorrect symbol estimates which may further result in incorrect channel estimates.

During the first pass of demodulation of a received slot, all of the information portion of the slot, regardless of whether it is unencoded or coded information, is treated as detected rather than known information by propagation characterization estimator 32 and mode selector 56. However, on the second pass of demodulation of the received slot, decoded information portions are processed as known bits as described above. Accordingly, during the second pass, mode selector 56 uses information based on the decoded symbols from the first pass for updating the channel tracker 50 and antenna tracker 52 during the corresponding coded portion of the received slot Mode selector 56 further provides for selection of a different bandwidth during decoded portions. Accordingly, the channel tracker 50 and antenna tracker 52 may operate at high bandwidths for enhanced tracking ability when processing previously decoded symbol information and at a lower bandwidth to allow reduced sensitivity of the channel tracker and antenna tracker to noise and incorrect symbol decisions during the remaining portion of the information segment of a received slot.

The present invention has been described above with respect to a simplified stochastic modeling of the coefficients of a Finite Impulse Response (FIR) channel model and an approximation of a Kalman predictor as explained in Lars Lindbom, "Simplified Kalman Estimation of Fading Mobile Radio Channels: High Performance at LMS Computational Load," International Conference on Acoustics, Speech and Signal Processing, Minneapolis, April 1993. However, those skilled in the art will appreciate that the invention is applicable to any kind of tracking algorithm.

A specific Kalman-type tracker is explained below. Simplification is provided by the use of conjugates of the channel taps multiplied by the data symbols to give the received signal. Each channel coefficient, corresponding to a delay $\tau$, is represented by two states, which form a state vector x. The first element of this vector is the channel coefficient itself. The second element will be described below. Also, the channel update equations for time k use received data at time k to predict the channel coefficients at k+1, ie., one step ahead. With MLSE equalization, a decision depth d is used to decide symbols d ago and earlier by tracing back along the best state at current time n. The general expression for updating the state vector for a given channel coefficient is given by:

$$x(n-d+1) = Fx(n-d) + M(\tau)s_{det}(n-d)e^*(n-d) \quad (1)$$

where x(k) is the predicted state vector at time k, F is the matrix relating previous state estimates to new state estimates, M is a diagonal matrix of step sizes $\mu_0(\tau)$ and $\mu_1(\tau)$, $s_{det}(k)$ is a vector of detected symbol values ($s_{det}(k)$, $s_{det}(k-1)$, . . . ) from time k back, and e(k) is the difference (error) between the received and the predicted data at time k, i.e., $$e(n-d) = r(n-d) - \sum_{\tau=0}^{J-1} c*(\tau; n-d)s_{det}(n-d-\tau) \quad (2)$$

where c($\tau$,k) denote the channel coefficient at time k for delay $\tau$.

The channel tracker includes several parameters. A variable number of channel taps (J) may be provided. If a channel model per state tracker is used, then d may be set to 0. Otherwise, d may be set to the number of taps. Thus, the remaining parameters needed to implement the tracker are F, $\mu_0(\tau)$ and $\mu_1(\tau)$.

The tracker models the channel tap time evolution with a second-order autoregressive process, with poles at $r_d \exp(\pm j \omega_d)$, where $r_d$ is the pole radius and $\omega_d$ is the angle which is given by:

$$\omega_d = 2\pi \frac{f_m}{f_u} \quad (3)$$

where $f_m$ is the maximum Doppler frequency in the channel (Hz) and $f_u$ is the channel tracking update rate (usually the symbol rate). There is a third parameter, $\gamma(\tau)$, which may be different for each channel coefficient. This parameter is related to signal to noise ratio (SNR) and tap size (i.e., tap coefficient magnitude). With the example autoregressive tracker, the states are defined according to:

$$x(k) = \begin{bmatrix} x_0(k) \\ x_1(k) \end{bmatrix} = \begin{bmatrix} c(\tau; k) \\ -a_2 c(\tau; k-1) \end{bmatrix} \quad (4)$$

The parameter $r_d$ is typically chosen close to unity and $\omega_d$ is selected based on the maximum vehicle speed encountered. These parameters then determine the 2nd order model parameters and the F matrix:

$$a_1 = -2r_d\cos(\omega_d), \; a_2 = r_d^2, \; F = \begin{bmatrix} -a_1 & 1 \\ -a_2 & 0 \end{bmatrix} \quad (5)$$

The step sizes $\mu_0(\tau)$ and $\mu_1(\tau)$ also depend on $\gamma(\tau)$, which is determined from synchronization information and a nominal setting y, typically a negative power of 10, such as $10^{-3}$. After synchronization, let $C(\tau)$ denote quantities related to the magnitude squared of the sync correlation values corresponding to channel tap delays $\tau$. Also, let $C_{max}$ denote the largest of these values, corresponding the strongest signal ray. Then, the $\gamma(\tau)$ values are determined by:

$$\gamma(\tau) = f(\tau)\gamma \quad (6)$$

where $$f(\tau) = \max\left\{ \frac{C(\tau)}{(1-\alpha)C(\tau) + \alpha C_{max}}, \beta \right\} \quad (7)$$

This introduces two additional parameters, $\alpha$ and $\beta$, each having a value between 0 and 1. Typical terminal values for $\alpha$ and $\beta$ for a digital cellular system application are 0.08 and 0.17, respectively, though flat fading performance may be optimized with values of 1.0 and 0.0 respectively. Once the $\gamma(\tau)$ are determined, the step sizes are computed as follows:

$$\mu_0 = \frac{1}{\sigma_d^2(1+p_{11})}(-a_1 p_{11} + p_{12}) \quad (8a)$$

$$\mu_1 = \frac{1}{\sigma_d^2(1+p_{11})}(-a_2 p_{11}) \quad (8b)$$

where $$p_{11} = -1 + \frac{\zeta + \sqrt{\zeta^2 - 4a_2^2}}{2} \quad (9a)$$

$$p_{12} = \left(\frac{a_1 a_2}{1 + a_2 + p_{11}}\right)p_{11} \quad (9b)$$

$$\zeta = \frac{\alpha_0 - 2a_2 + \sqrt{(\alpha_0 + 2a_2)^2 - 4a_1^2(1+a_2)^2}}{2} \quad (9c)$$

$$= \frac{\alpha_0 - 2a_2 + \sqrt{\frac{[(a_2 - a_1 + 1)^2 + \gamma(\tau)]}{[(a_2 + a_1 + 1)^2 + \gamma(\tau)]}}}{2}$$

$$\alpha_0 = 1 + a_1^2 + a_2^2 + \gamma(\tau)\sigma_d^2 = 1 \quad (9d)$$

Thus, the channel tracker described above has 5 specific design parameters: $r_d$, $\omega_d$, $\gamma$, $\alpha$ and $\beta$. The bandwidth of the tracker is predominantly determined by $\omega_d$ and $\gamma$. Accordingly, either of these parameters may be utilized for gain adjustment according to the present invention. Decreasing $\omega_d$ or $\gamma$ reduces gain to provide a lower bandwidth to the channel tracker.

There typically is a need to "extrapolate" the channel coefficient estimates at time n-d+1 to time n+1, when the next Viterbi algorithm iteration will occur. In general, the states can be predicted d steps into the future by multiplying with $F^d$. Only the first row of this matrix is needed to extrapolate the first state, the channel coefficient. For example, for d=2, the channel tap prediction is given by:

$$c(\tau; n+1) = [(a_1^2 - a_2) - a_1]x(\tau; n-1) \quad (10)$$

$$= (a_1^2 - a_2)x_0(\tau; n-1) - a_1 x_1(\tau; n-1)$$

For d=0, as in the channel model per state case, prediction is not necessary. The states for each channel tap may be initialized using the synchronization correlation (or training) values. Thus, the first state would be initialized with the estimate from synchronization. The second state would be set to $-a_2$ times this value. These values are then "trained" over the synchronization field, using equation (1) with known symbols and d=0, instead of detected symbols and d not necessarily equal to 0. Channel trackers are further described in "*Adaptive MLSE Performance on the D-AMPS 1900 Channel,*" IEEE Transactions on Vehicular Technology, Vol. 46, No. 3, August 1997, pp. 634–641.

While the present invention has been described with respect to frames and symbols, these terms are used in a generic sense. Thus, a frame generically refers to a predefined grouping of symbols in a sequence. A symbol generically refers to an information unit such as, for example, a bit or a non-binary symbol such as a quaternary symbol as provided using differential quadrature phase shift keying (DQPSK) where a received symbol is represented by both a real (amplitude) and an imaginary (phase) part.

Operations according to the present invention will now be further described with reference to the flowchart of FIG. 5. At block 100, receiver 22 receives a modulated signal and, typically, buffers a frame or slot segment of the received modulated signal. The received signal includes a first received signal corresponding to coded information and a second received signal corresponding to unencoded information. The received signals may be represented as complex number symbols which represent transmitted information from the modulated signal such as that provided using a DQSPSK modulation. At block 102, the propagation characterization of the channel over which the received signal was transmitted is initialized. This initialization at the start of a frame is typically provided responsive to the synchronization period of the modulated signal as illustrated in FIG. 4 as the period 0-A.

Figure 5:
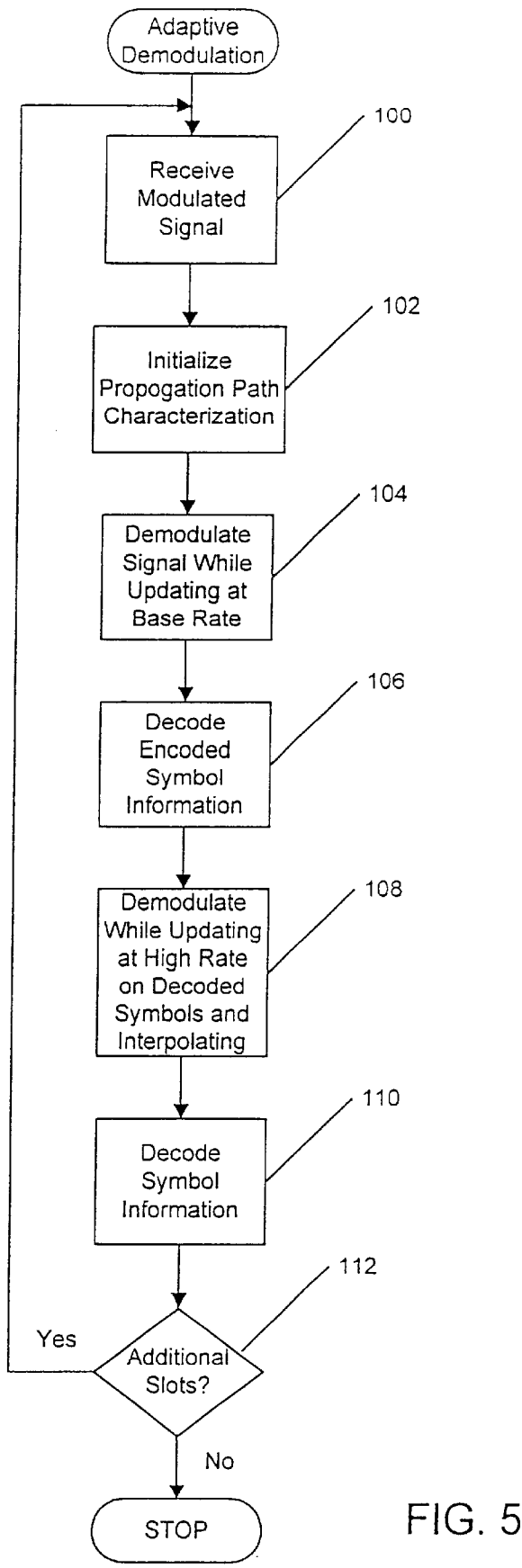
FIG. 5 is a flow chart illustrating operations according to one embodiment of the present invention.

All operations as described with reference to FIG. 5 are presented relative to a single received signal but it is to be understood that, in the preferred embodiment, the receiver includes a plurality of spatially displaced antennas 16 each of which provides a received signal output and each of which has an associated propagation characterization. Accordingly, propagation characterization includes both channel tracking based on time dispersion of the channel as well as antenna tracking based on spatial characterizations of received signals. Each of these underlying concepts are generally known to those of skill in the art and need not be described further herein.

By way of context, in systems with excess bandwidth, it may be beneficial to process the received signal at a sampling rate higher than the symbol rate. For example, with IS-136, transmitter pulse typically has 35% excess bandwidth. In other words, the symbol rate is 24.3 ksymbols/s while bandwidth is 32.81 kHz. A baseline demodulator generally processes the received signal at the symbol rate, that is at one sample per symbol. Excess bandwidth can be viewed as a form of diversity and exploited in a manner similar to antenna diversity. Specifically, the received signal can be sampled at a rate of 2 samples per symbol. The two samples can be thought of as two antennas and processed accordingly. For example, a terminal with a single antenna can use a receiver with two samples per symbol, with each sample being treated as coming from a different antenna and thereby may utilize the antenna tracking aspects of the present invention in a system with only a single receive antenna.

In systems with IRC, an alternative form of tracking processes the channel taps tracker and the impairment matrix tracker jointly. Specifically, as described in U.S. Pat. No. 5,822,380 to Bottomley, an error signal from the demodulator can be processed by a matrix derived from the impairment matrix to attenuate the interference content in the error signal. The modified error signal is then used in the channel tap tracker. This method may be referred to as pre-cancellation. Pre-cancellation typically improves receiver performance by reducing the impact of interference on channel tap estimates. This in turn improves demodulator performance and impairment matrix tracking.

Pre-cancellation may be combined with the present invention. The bandwidth of the channel tap tracker and the impairment matrix tracker can be varied according to whether the symbol is known, unknown, or re-encoded. A matrix derived from the impairment matrix may the be used to process the error signal prior to using it in the channel tap tracker.

As shown at block 104, the received signal is demodulated during a first demodulation pass while updating the channel tracker and antenna tracker at a base bandwidth appropriate for updates based on detected rather than known symbols. At block 106, the detected symbol estimates from estimator 54 and the first pass of demodulation are decoded by decoder 58 to provide decoded symbol estimates. At block 108, the received slot is again demodulated during second pass demodulation. However, unlike the first pass of demodulation, during second pass demodulation, the decoded symbols from decoder 58, re-encoded to an appropriate form for use as an estimate generated from the first pass demodulation of coded received signals, are fed back and used for updating the channel tracker 50 and antenna tracker 52. Accordingly, the propagation characterization, including both the updating of channel tracker 50 and impairment correlation estimator 52, is updated at a higher bandwidth based on use of the pseudo-known symbols from the decoded symbols.

During portions of demodulation on the second pass where unencoded information from the frame is being processed, operations may continue based on the use of detected symbols from estimator 54 and the base updating bandwidth for channel tracker 50 and antenna tracker 52. Alternatively, the propagation characteristics may be interpolated as will be described further below.

At block 110, the detected symbols from the second pass are decoded in decoder 58 with the output decoded symbols being provided to user interface 36. If additional slots have been received and are ready for processing at block 112, operations return and resume at block 100. Accordingly, through the described two-pass operations of demodulation, the present invention provides for updating the propagation characterization at a first bandwidth responsive to an estimate generated from the first received signal corresponding to a decoded symbol and a second bandwidth lower than the first bandwith responsive to a second received signal corresponding to an undecoded symbol contained within a received slot. The bandwidths of the channel tracker and antenna tracker may be provided by gain adjustments such as the example for the autoregressive channel tracker above.

The present invention has been described with respect to FIG. 5 which is a flowchart illustration of an embodiment of the present invention. It will be understood that each block of the flowchart illustration, and combinations of blocks in the flowchart illustration, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Operations according to the present invention related to the channel interpolation aspects will now be described. Referring first to FIG. 4, interpolation is an alternative approach to processing of the unencoded information portions B–C, F–G, J–K of a received slot during the second pass of demodulation. The changes in the propagation characteristics across the unencoded information portions are, essentially, interpolated based on channel information obtained in the coded portions D–E, H–I, Y–Z. Interpolation operations will be described with reference to the case of a DQPSK modulated signal by reference to the alternative embodiments of FIGS. 6 and 7.

In the case of DQPSK modulation, the known bit information from the coded portions is only actually known based on differential symbols or known phase changes between transmitted symbols. In other words, while these groups of symbols represent what are treated as known bit information from the first demodulation pass, it is actually only the phase change between symbols and not the absolute phase of each which can be reliably considered known. Consequently, given a group of known symbols, the channel estimated over those symbols could actually be a channel with an offset of plus $\pi/2$, minus $\pi/2$, or $\pi$ radian phase shifts in absolute phase. According to the present invention, this ambiguity in absolute phase is accommodated by the interpolation techniques described herein.

Interpolation operations begin at a known sequence of symbols such as D–E in FIG. 4 during which one of the four possible absolute phases may be arbitrarily selected as the channel estimate defining the channel phase as the modulation technique is differential. However, to use an interpolated channel estimate for demodulation of the unknown symbols following this known sequence, i.e., for the period F–G, four versions of the interpolated channel estimate are created representing the four possible channel estimates at the next set of known symbols H–I. The interpolated channel estimates may then be used to demodulate the unknown symbols in the period F-G between known sets of symbols D–E, H–I. Once the demodulation of the unknown symbols is completed for the segment F–G, three of the possible four channel estimates maintained are dropped H–I by selecting one of a plurality of propagation characterizations or channel estimates to use in demodulating the unencoded symbols. By narrowing the number of channel estimates at the next point of known symbols, (H–I), to 1, the process can be repeated over succeeding sets of unknown and known symbols.

Figure 6:
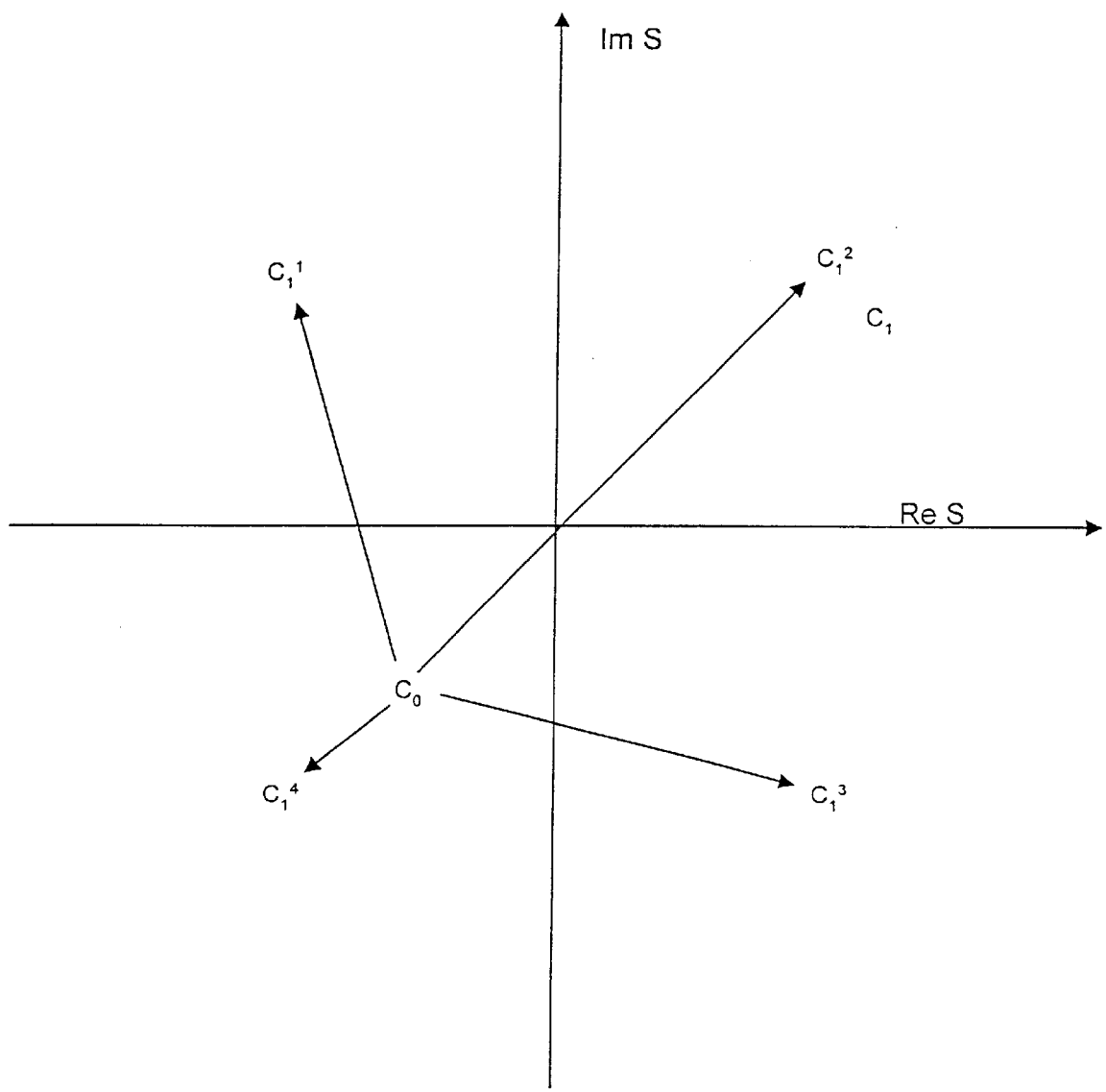
FIG. 6 illustrates channel interpolation according to a first alternative embodiment of the present invention.
Figure 7:
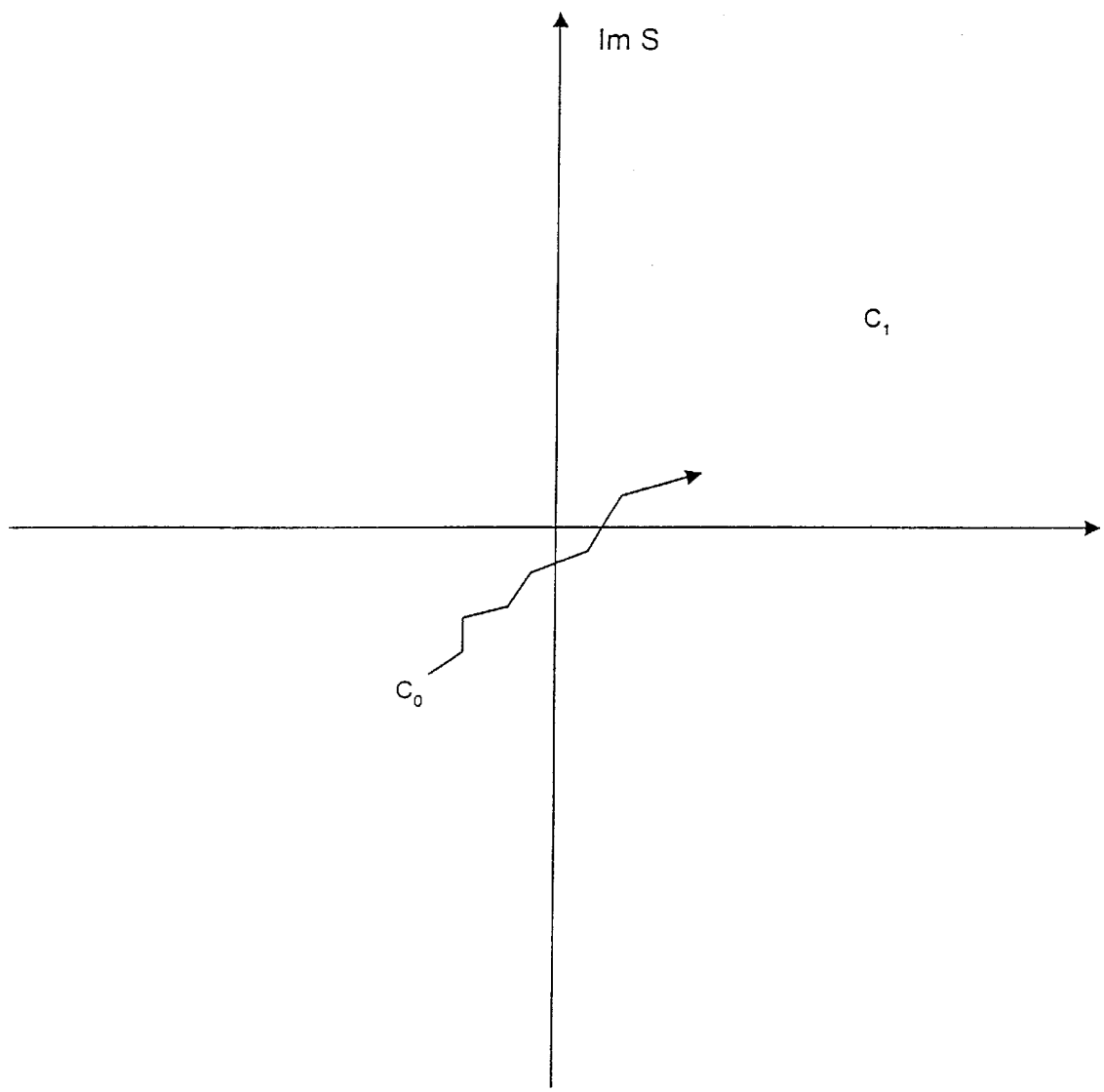
FIG. 7 illustrates channel interpolation according to a second alternative embodiment of the present invention.

As shown in both the embodiments of FIGS. 6 and 7, a plurality of propagation characterizations corresponding to π/2 radian phase shifts are maintained for at least a portion of demodulation between the first group of symbols corresponding to decoded symbols and the second group of symbols corresponding to decoded symbols. As shown in the embodiment of FIG. 6, the four separate propagation characterizations are maintained throughout the period of unknown symbols. In other words, the sequence of unknown symbols between the known symbol sets is demodulated four separate times from the first known symbol channel estimate, represented in FIG. 6 as $c_0$, to each of the four possible absolute phase points $\hat{c}_1^1$, $\hat{c}_1^2$, $\hat{c}_1^3$, $\hat{c}_1^4$ based upon the known channel estimates at time 1 determined from the known symbols. A linear interpolation along each of the four paths is used with one path selected for each of the four demodulations of the sequence of unknown symbols. The best result match at time 1 is then selected as the appropriate demodulation sequence estimate for the unknown symbol information period. The best result determination could, for example, be based upon selecting the sequence out of the four which provides the best metric resulting from a Viterbi type MLSE demodulation algorithm.

The described operations of the present invention can be generalized to include three or more block so sync symbols or re-encoded symbols. Referring to FIG. 4, OA, De, and HI can be used simultaneously for interpolation. As the absolute phase reference is not relevant, the phase of OA is fixed as a reference. The pahse of DE then has an ambiguity of 4 possible multiples of π/2 as does the phase of HI for a total of sixteen possibilities. Therefore, OA, DE and HI may be used to create sixteen different trajectories. The demodulator may then be applied sixteen times and a single trajectory may be retained based on the demodulator metric. The advantage of using three or more blocks for interpolation is potentially improved channel estimation. The disadvantage is the increase in the number of possible trajectories and the corresponding increase in demodulator usage.

An alternative approach to interpolation across the period of unencoded information is illustrated in FIG. 7. In the embodiment of FIG. 7, the tracker operates in a step by step manner to walk towards the actual channel estimate at time 1 from the time 0 estimate (illustrated as $\hat{c}_0$). As with respect to FIG. 6, $\hat{c}_0$ represents "known" channel estimates from the period of "known" information from decoded symbol feedback and $c_1$ represents correct absolute phase at time 1. Using the embodiment of FIG. 7 as the demodulation progresses over the unknown bits, the channel is tracked and the resulting tracker estimate of the channel is compared to the four possible interpolated channel estimates over the step period. After some selected number of symbols, the best interpolated channel estimate is chosen and demodulation proceeds starting from this choice sequence for another period during which the comparisons to the four possible interpolated channel estimates are again carried out. In this embodiment, the best interpolated channel estimate may be provided through the use of selection of the sequence which agrees with the channel tracker estimate most accurately based on a minimum mean square error criteria. Accordingly, using either of the illustrated embodiments, channel tracking across the unencoded information portions of a received slot may be improved utilizing decoded symbol information corresponding to the coded information portions of the slot.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method for characterizing propagation of a modulated signal received by a wireless device comprising the step of:

updating a propagation characterization at a first bandwidth responsive to an estimate generated from a first received signal corresponding to a decoded symbol and at a second bandwidth lower than the first bandwidth responsive to a second received signal corresponding to an undecoded symbol.

2. A method according to claim 1 wherein the estimate generated from a first received signal and the second received signals are complex number symbols representing transmitted information from the modulated signal.

3. A method according to claim 1 wherein the updating step includes the step of maintaining a channel estimate characterizing propagation of the modulated signal using a channel tracker wherein the channel tracker has a gain and the first bandwidth and the second bandwidth are established by setting the gain of the channel tracker.

4. A method according to claim 1 wherein the modulated signal is received by a plurality of spatially diverse antennas each of which provides a received signal output and each of which has an associated propagation characterization and wherein the updating step includes the step of maintaining an impairment correlation matrix for the plurality of antennas using an impairment correlation estimator and wherein the impairment correlation estimator has a gain and the first bandwidth and the second bandwidth are established by setting the gain of the impairment correlation estimator.

5. A method according to claim 1 wherein the updating step is preceded by the step of initializing the propagation characterization responsive to a synchronization period of the modulated signal.

6. A method according to claim 1 further comprising the steps of:

receiving the modulated signal to provide the first received signal;

demodulating the first received signal while updating the propagation characterization at the second bandwidth;

decoding the demodulated first received signal to provide the estimate generated from the first received signal; and then, demodulating the first received signal while updating the propagation characterization at the first bandwidth.

7. A method according to claim 1 further comprising the step of:

interpolating the propagation characterization during demodulation of a portion of the modulated signal not corresponding to a decoded symbol.

8. A method according to claim 7 wherein the modulated signal is a DQPSK modulated signal and wherein the step of interpolating further comprises the steps of:

maintaining a plurality of propagation characterizations corresponding to $\pi/2$ radian phase shifts during demodulation between a first group of symbols corresponding to decoded symbols and a second group of symbols corresponding to decoded symbols; and selecting one of the plurality of propagation characterizations to use for demodulating the signal between the first group and the second group of symbols.

9. A method according to claim 8 wherein the propagation characterizations are channel estimates from a channel tracker.

10. A method according to claim 9 wherein the selecting step is followed by the steps of:

maintaining the plurality of channel estimates corresponding to $\pi/2$ radian phase shifts during demodulation between the second group of symbols and a third group of symbols corresponding to decoded symbols; and selecting one of the plurality of channel estimates to use for demodulating the signal between the second group and the third group of symbols.

11. A method according to claim 9 wherein the selecting step comprises the step of selecting one of the plurality of channel estimates based on a best metric selection criteria.

12. A method according to claim 9 wherein the selecting step comprises the steps of:

maintaining a channel estimate characterizing the propagation of the modulated signal based on the received modulated signal;

comparing the maintained channel estimate to the plurality of channel estimates for a portion of the signal between the first group and the second group of symbols; and selecting the one of the plurality of channel estimates which most closely agrees with the maintained channel estimate for the portion of the signal.

13. A method according to claim 12 further comprising the step of:

repeating the maintaining, comparing and selecting steps for a plurality of portions of the signal between the first group and the second group of symbols.

14. A method according to claim 12 wherein the step of selecting the one of the plurality of channel estimates which most closely agrees with the maintained channel estimate comprises the step of selecting the one of the plurality of channel estimates which most closely agrees with the maintained channel estimate based on a minimum mean square error criteria.

15. A method for receiving a modulated signal including a plurality of sequentially transmitted slots on a channel, the method comprising the steps of:

receiving one of the transmitted slots on a plurality of separate receive antennas to provide a plurality of received signals, each having a portion corresponding to encoded symbols and a portion corresponding to unencoded symbols;

demodulating the received signals while updating an estimate of the channel responsive to the received signals at a first bandwidth and an impairment correlation estimate for the plurality of separate receive antennas responsive to the received signals at a second bandwidth to provide a first slot estimate;

decoding a portion of the first slot estimate corresponding to the portion of the received signals corresponding to encoded symbols to provide decoded symbol estimates; and then demodulating the received slot to provide a second slot estimate while updating the estimate of the channel responsive to the decoded symbol estimates at a third bandwidth greater than the first bandwidth and updating the impairment correlation estimate for the plurality of separate receive antennas responsive to the decoded symbol estimates at a fourth bandwidth greater than the second bandwidth.

16. A method according to claim 15 further comprising the step of:

interpolating the estimate of the channel during the portion of the received signals corresponding to unencoded symbols.

17. A method according to claim 16 further comprising the step of:

interpolating the impairment correlation matrix during the portion of the received signals corresponding to unencoded symbols.

18. A method for channel interpolation in a receiver receiving a DQPSK modulated signal having offset periods of known receive symbols and periods of unknown receive symbols, the method comprising the steps of:

maintaining a plurality of channel estimates corresponding to $\pi/2$ radian phase shifts during demodulation between a first group of known receive symbols and a second group of known receive symbols; and selecting one of the plurality of channel estimates to use for demodulating the signal between the first group and the second group of known receive symbols.

19. A method according to claim 18 wherein the selecting step is followed by the steps of:

maintaining the plurality of channel estimates corresponding to $\pi/2$ radian phase shifts during demodulation between the second group of known receive symbols and a third group of known receive symbols; and selecting one of the plurality of channel estimates to use for demodulating the signal between the second group and the third group of known receive symbols.

20. A method according to claim 18 wherein the selecting step comprises the step of selecting one of the plurality of channel estimates based on a best metric selection criteria.

21. A method according to claim 18 wherein the selecting step comprises the steps of:

tracking a channel response based on the received DQPSK signal;

comparing the tracked channel response to the plurality of channel estimates for a portion of the signal between the first group and the second group of symbols; and selecting the one of the plurality of channel estimates which most closely agrees with the tracked channel response for the portion of the signal.

22. A method according to claim 21 further comprising the step of:

repeating the maintaining, comparing and selecting steps for a plurality of portions of the signal between the first group and the second group of symbols.

23. A method according to claim 21 wherein the step of selecting the one of the plurality of channel estimates which most closely agrees with the tracked channel response comprises the step of selecting the one of the plurality of channel estimates which most closely agrees with the tracked channel response based on a minimum mean square error criteria.

24. A system for characterizing propagation of a modulated signal received by a wireless device comprising:

means for updating a propagation characterization at a first bandwidth responsive to an estimate generated from a first received signal corresponding to a decoded symbol and at a second bandwidth lower than the first bandwidth responsive to a second received signal corresponding to an undecoded symbol.

25. A system according to claim 24 wherein the means for updating further comprises means for maintaining a channel estimate characterizing propagation of the modulated signal using a channel tracker wherein the channel tracker has a gain and the first bandwidth and the second bandwidth are established by setting the gain of the channel tracker.

26. A system according to claim 25 wherein the modulated signal is received by a plurality of spatially displaced antennas each of which provides a received signal output and each of which has an associated propagation characterization and wherein the means for updating includes means for maintaining an impairment correlation matrix for the plurality of antennas using an impairment correlation estimator and wherein the impairment correlation estimator has a gain and the first bandwidth and the second bandwidth are established by setting the gain of the impairment correlation estimator.

27. A system according to claim 26 further comprising:

means for receiving the modulated signal to provide the first received signal;

means for demodulating the first received signal while updating the propagation characterization at the second bandwidth;

means for decoding the demodulated first received signal to provide the estimate generated from the first received signal; and means for demodulating the first received signal while updating the propagation characterization at the first bandwidth.

28. A system according to claim 27 further comprising:

means for interpolating the propagation characterization during demodulation of a portion of the modulated signal not corresponding to a decoded symbol.

29. A system for channel interpolation in a receiver receiving a DQPSK modulated signal having offset periods of known receive symbols and periods of unknown receive symbols, the system comprising:

means for maintaining a plurality of channel estimates corresponding to $\pi/2$ radian phase shifts during demodulation between a first group of known receive symbols and a second group of known receive symbols; and means for selecting one of the plurality of channel estimates to use for demodulating the signal between the first group and the second group of known receive symbols.

30. A system according to claim 29 wherein the means for maintaining further comprises means for maintaining the plurality of channel estimates corresponding to $\pi/2$ radian phase shifts during demodulation between the second group of known receive symbols and a third group of known receive symbols and wherein the means for selecting further comprises means for selecting one of the plurality of channel estimates to use for demodulating the signal between the second group and the third group of known receive symbols.

31. A system according to claim 29 wherein the selecting means further comprises means for selecting one of the plurality of channel estimates based on a best metric selection criteria.

32. A system according to claim 29 wherein the selecting means further comprises:

means for tracking a channel response based on the received DQPSK signal;

means for comparing the tracked channel response to the plurality of channel estimates for a portion of the signal between the first group and the second group of symbols; and means for selecting the one of the plurality of channel estimates which most closely agrees with the tracked channel response for the portion of the signal.

* * * * *

UNITED STATES PATENT AND TRADEMARK OFFICE
CERTIFICATE OF CORRECTION

PATENT NO.    : 6,320,919 B1
DATED         : November 20, 2001
INVENTOR(S)   : Ali S. Khayrallah It is certified that error appears in the above-identified patent and that said Letters Patent is hereby corrected as shown below:

<u>Column 8,</u>
Line 65, please change the equation as follows:

"$(r_k-k'_k)^H R_k^{-1}(r_k-r^1_k)$" to -- $(r_k-\underline{r}'_k)^H R_k^{-1}(r_k-r^1_k)$ --

Signed and Sealed this

Fourth Day of June, 2002

*Attest:*

*Attesting Officer*

JAMES E. ROGAN
*Director of the United States Patent and Trademark Office*